United States Patent [19]

Dittmer

[11] Patent Number: 6,073,892
[45] Date of Patent: *Jun. 13, 2000

[54] MODULAR PROJECTOR LIFT

[75] Inventor: Jay S. Dittmer, Burnsville, Minn.

[73] Assignee: Chief Manufacturing, Inc., Burnsville, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/661,609

[22] Filed: Jun. 11, 1996

[51] Int. Cl.$^7$ .......................... F16M 11/00; F16M 13/00; A47H 1/10

[52] U.S. Cl. .......................... 248/157; 248/422; 248/327; 248/346.07; 248/333; 74/89.21; 348/825; 348/836

[58] Field of Search .................................. 248/404, 157, 248/422, 327, 346.07, 333; 74/89.21; 348/825, 826, 827, 836, 839; 188/171

[56] References Cited

U.S. PATENT DOCUMENTS

| 322,515 | 7/1885 | Young . |
| 326,364 | 9/1885 | Weston . |

(List continued on next page.)

FOREIGN PATENT DOCUMENTS

| 598232 | 5/1994 | European Pat. Off. ................ 248/157 |
| 1216812 | 1/1960 | France . |
| 539199 | 11/1931 | Germany ................................ 248/404 |
| 31 20938 | 1/1982 | Germany . |
| 3928701 | 3/1991 | Germany ................................ 248/157 |

OTHER PUBLICATIONS

"Projector Lifts" from SVC Inc., eight page product catalog by Daniels Publishing Group, Inc. (1995).
"Taking Video Projection to New Heights," two sheets by Display Devices, Inc.
"Control Systems for Video Projector Lifts," three sheets by Draper Shade & Screen Co., Inc. © 1994.
"Video Projector Lift Models VPL–20 and VPL–16," two sheets by Stewart Filmscreen Corporation © 1991.
"Da–Lift Video Projector Lift" specification data sheet, Da–Lite Screen Company, Inc. (one page).
"Magna–Lift™," Electric Ceiling Mount, by Chief Manufacturing, Inc., four pages.
"Magna–Series," Electric Ceiling Series, by Chief Manufacturing, Inc., eight pages.
"DataLift," Data and Video Projector Mounting System, by Display Devices, Inc., two pages.
"DataLift," Projector Display Devices, by Display Devices, Inc., four pages.
"Dual Steel Cable Drive Hand Crank Portable Service/Install Winch System," by Progressive Marketing Productings, Inc., 1 page.

*Primary Examiner*—Daniel P. Stodola
*Assistant Examiner*—Gregory J. Strimbu
*Attorney, Agent, or Firm*—Faegre & Benson LLP

[57] ABSTRACT

A modular projector lift system for moving a projection device along a path between an extended position and a retracted position. The modular projector lift system includes a drive assembly expandable along a first axis. At least one movable support is mechanically engagable with the drive assembly at a plurality of positions along the first axis. The movable support moves the projection device between the extended position and the retracted position. A brake mechanism is optionally included for retaining the projection device at a particular location. The brake mechanism includes a plurality of rotating brake plates connected to the drive shaft of the drive assembly and a plurality of static brake plates connected to the drive assembly compressively engaged with the rotating brake plates. Adjustable limit switches are optionally provided for adjusting a location of the retracted and the extended positions along the path.

24 Claims, 8 Drawing Sheets

U.S. PATENT DOCUMENTS

| | | | |
|---|---|---|---|
| 936,681 | 10/1909 | Union . | |
| 1,735,276 | 11/1929 | Henk | 248/404 X |
| 1,819,516 | 8/1931 | Kelly . | |
| 1,964,339 | 6/1934 | Brassell . | |
| 2,435,755 | 2/1948 | Schimpff . | |
| 2,494,364 | 1/1950 | Shaw | 348/836 X |
| 2,708,540 | 5/1955 | Cook et al. | 248/327 X |
| 2,805,776 | 9/1957 | Levitin | 248/157 |
| 2,890,010 | 6/1959 | Barkheimer | 248/422 X |
| 2,933,198 | 4/1960 | Firestone et al. . | |
| 3,032,308 | 5/1962 | Hansen . | |
| 3,289,797 | 12/1966 | Brzezinski et al. | 188/171 |
| 3,373,285 | 3/1968 | Barrett | 248/327 X |
| 3,457,006 | 7/1969 | Brown et al. . | |
| 3,557,892 | 1/1971 | Burrough | 180/14.1 |
| 3,592,070 | 7/1971 | Hammond | 74/89.15 |
| 3,752,267 | 8/1973 | Dovell et al. | 188/171 |
| 3,759,475 | 9/1973 | Brown . | |
| 3,822,051 | 7/1974 | Karapita | 248/333 |
| 3,952,983 | 4/1976 | Crochet | 248/346.07 X |
| 4,060,292 | 11/1977 | Medina . | |
| 4,093,364 | 6/1978 | Miller . | |
| 4,160,999 | 7/1979 | Claggett . | |
| 4,202,430 | 5/1980 | Stevens | 188/171 |
| 4,225,881 | 9/1980 | Tovi . | |
| 4,313,208 | 1/1982 | Kavenik . | |
| 4,412,601 | 11/1983 | Cooper . | |
| 4,435,830 | 3/1984 | Suzuki et al. | 378/197 |
| 4,477,981 | 10/1984 | Chan | 34/445 |
| 4,509,620 | 4/1985 | Verbos | 188/171 |
| 4,577,827 | 3/1986 | Eliscu . | |
| 4,579,012 | 4/1986 | Mabie et al. | 74/89.15 |
| 4,637,322 | 1/1987 | Hampshire | 108/102 |
| 4,750,832 | 6/1988 | Lloyd, Sr. et al. . | |
| 4,764,008 | 8/1988 | Wren . | |
| 4,821,847 | 4/1989 | Langdon et al. | 188/171 |
| 4,830,147 | 5/1989 | Kawada . | |
| 4,843,782 | 7/1989 | Gustaveson et al. . | |
| 4,867,000 | 9/1989 | Lentz | 74/89.15 |
| 4,941,718 | 7/1990 | Alexander, III et al. . | |
| 4,964,606 | 10/1990 | Beam et al. | 248/333 |
| 4,978,080 | 12/1990 | Weitekamp | 241/101.2 |
| 4,978,984 | 12/1990 | Brookfield . | |
| 5,037,059 | 8/1991 | Asano et al. . | |
| 5,129,611 | 7/1992 | Grover et al. | 248/688 |
| 5,169,114 | 12/1992 | O'Neill | 248/551 |
| 5,186,288 | 2/1993 | Sommer | 188/171 |
| 5,240,220 | 8/1993 | Elberbaum . | |
| 5,261,645 | 11/1993 | Huffman . | |
| 5,310,152 | 5/1994 | O'Neill . | |
| 5,366,203 | 11/1994 | Huffman . | |
| 5,400,993 | 3/1995 | Hamilton | 248/279.1 |
| 5,402,544 | 4/1995 | Crawford et al. | 5/616 |
| 5,437,351 | 8/1995 | Lindner | 188/171 X |
| 5,477,597 | 12/1995 | Catania et al. | 29/34 B |
| 5,531,283 | 7/1996 | Austin et al. | 180/53.1 |
| 5,611,130 | 3/1997 | Rummell et al. | 29/34 B |
| 5,661,892 | 9/1997 | Catania et al. | 29/525.02 |
| 5,769,596 | 6/1998 | Burton | 414/723 |
| 5,809,908 | 9/1998 | Catta et al. | 108/147 |

MODULAR PROJECTOR LIFT

FIELD OF THE INVENTION

The present invention relates to a modular projector lift and, in particular, to a projector lift system that can be expanded or contracted to accommodate projectors of various sizes.

BACKGROUND OF THE INVENTION

Audiovisual equipment, such as televisions, projectors, and computer monitors are in widespread usage for home entertainment and business applications, as well as theaters, auditoriums, and presentation rooms. In order to enhance the aesthetics of these facilities, it is becoming increasingly common to store audiovisual equipment in ceilings, cabinets, walls, and floors. For example, audiovisual equipment can be raised and lowered through the center of a conference table. Typically, a false surface or panel is affixed to the projector lift system to conceal the audiovisual equipment under the table when not in use.

Prior lift systems are typically designed to fit a particular size piece of audiovisual equipment. With the explosive growth in the variety and sizes of audiovisual equipment, manufacturers of lift systems typically build different systems to accommodate different size audiovisual equipment. Additionally, some prior lift systems lack the accuracy and repeatability to precisely position a false surface or panel for effectively concealing the audiovisual equipment. Prior lift systems generally lack a safety feature to prevent the user from being injured if they inadvertently place their fingers at the sheer point between the moving audiovisual equipment and a storage compartment. Finally, as the size of audiovisual equipment continues to increase, with a corresponding increases in weight, many prior lift systems lack the braking capacity to safely retain the audiovisual equipment in an extended or exposed position for a prolonged period of time.

SUMMARY OF THE INVENTION

The present invention relates to a modular projector lift that can be expanded or contracted to accommodate projector devices of various sizes. The modular projector lift can be accurately and repeatably positioned at desired locations. The projector lift system may also include a brake system sufficient to retain large projection devices in an extended position.

The modular projector lift system moves a projection device along a path between an extended position and a retracted position. The drive assembly is expandable along a first axis. The movable support is mechanically engageable with the drive assembly at a plurality of positions along the first axis. The movable support moves the projection device between the extended position and the retracted position.

The present modular projector lift system may be configured to move a projection device in a variety of orientations. The retracted position may be either above or below the extended position. Alternatively, the path of movement may be horizontal.

The drive assembly is preferably a motor having a telescoping drive shaft oriented parallel to the first axis. The drive assembly utilizes a drive chain coupled to the movable support. A false surface may optionally be connected to the modular projector lift for concealing the modular projector lift system when in the retracted position. In one embodiment, the movable support is a slide bracket movable in an extrusion along the path. Alternatively, the movable support may be constructed as a telescoping structure movable along the path. The telescoping structure may include two or more telescoping extrusion members. The modular projector lift preferably includes a pair of movable supports having an adjustable separation along the first axis.

The drive assembly preferably includes a brake mechanism for maintaining the position of the movable support relative to the drive assembly. The brake mechanism is activated when electric power to the drive assembly is reversed. In one embodiment, the brake mechanism includes a plurality of rotating brake plates connected to a drive shaft. The drive shaft couples the drive assembly to the movable support. A plurality of static brake plates are connected to the drive housing compressively engaged with the rotating brake plates, respectively. The brake mechanism provides variable levels of compressive engagement between the rotating and the static brake plates.

The drive assembly may also include an adjustable limit switch for adjusting a location of the retracted position along the path. The adjustable limit switch may adjust the location of the extended and the retracted positions along the path.

At least one emergency pressure switch is provided for reversing movement of the movable support relative to the drive assembly. The pressure switch is preferably located at the shear point along the perimeter of the platform or the projection device for reversing movement of the projection device along the path.

In an alternate embodiment, the modular projector lift system includes a drive assembly expandable along a first axis. The drive assembly includes a telescoping drive shaft oriented parallel to the first axis. A pair of movable support are mechanically coupled to the drive shaft for moving the projection device between the extended position and the retracted position. The separation between pair of movable supports is adjustable along the first axis. A brake mechanism is provided for maintaining the position of the movable support relative to the drive assembly. The brake mechanism includes a plurality of rotating brake plates connected to the drive shaft and a plurality of static brake plates connected to the drive assembly compressively engaged with the rotating brake plates.

In yet another embodiment, the modular projector lift system has a drive assembly expandable along a first axis and a brake mechanism for maintaining the position of the movable supports relative to the drive assembly. A pair of movable supports are mechanically coupled to the drive shaft for moving the projection device between the extended position and the retracted position. The pair of movable supports have an adjustable separation along the first axis. Adjustable limit switches are provided for adjusting a location of the retracted and the extended positions along the path.

As used herein Projection Device refers to a television, computer monitor, video projector, or a variety of other audiovisual projector systems.

DETAILED DESCRIPTION OF THE PREFERRED EMBODIMENTS

Figure 1:
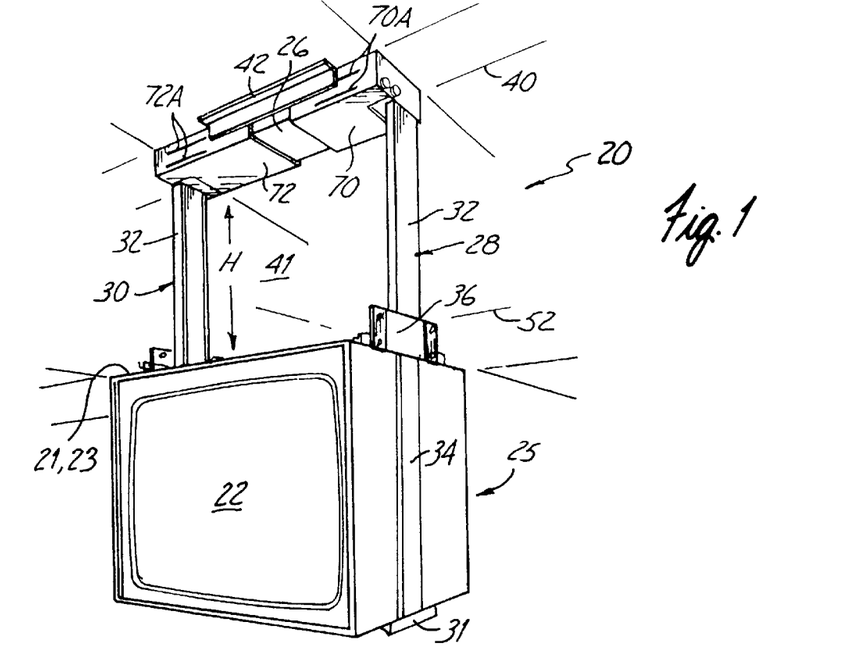
FIG. 1 is a perspective view of a modular projector lift system extending below a surface.
Figure 2:
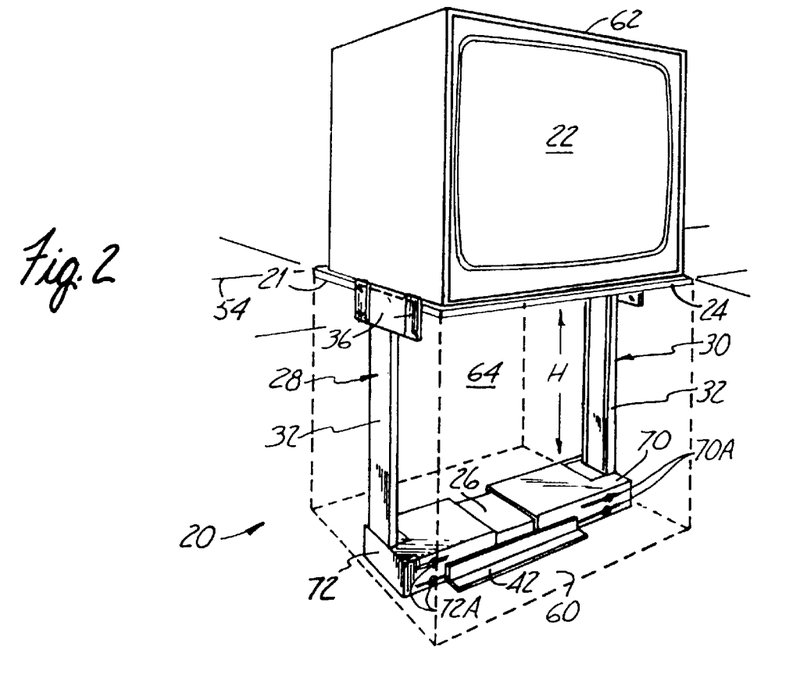
FIG. 2 is a perspective view of a modular projector lift system extending above a surface.
Figure 3:
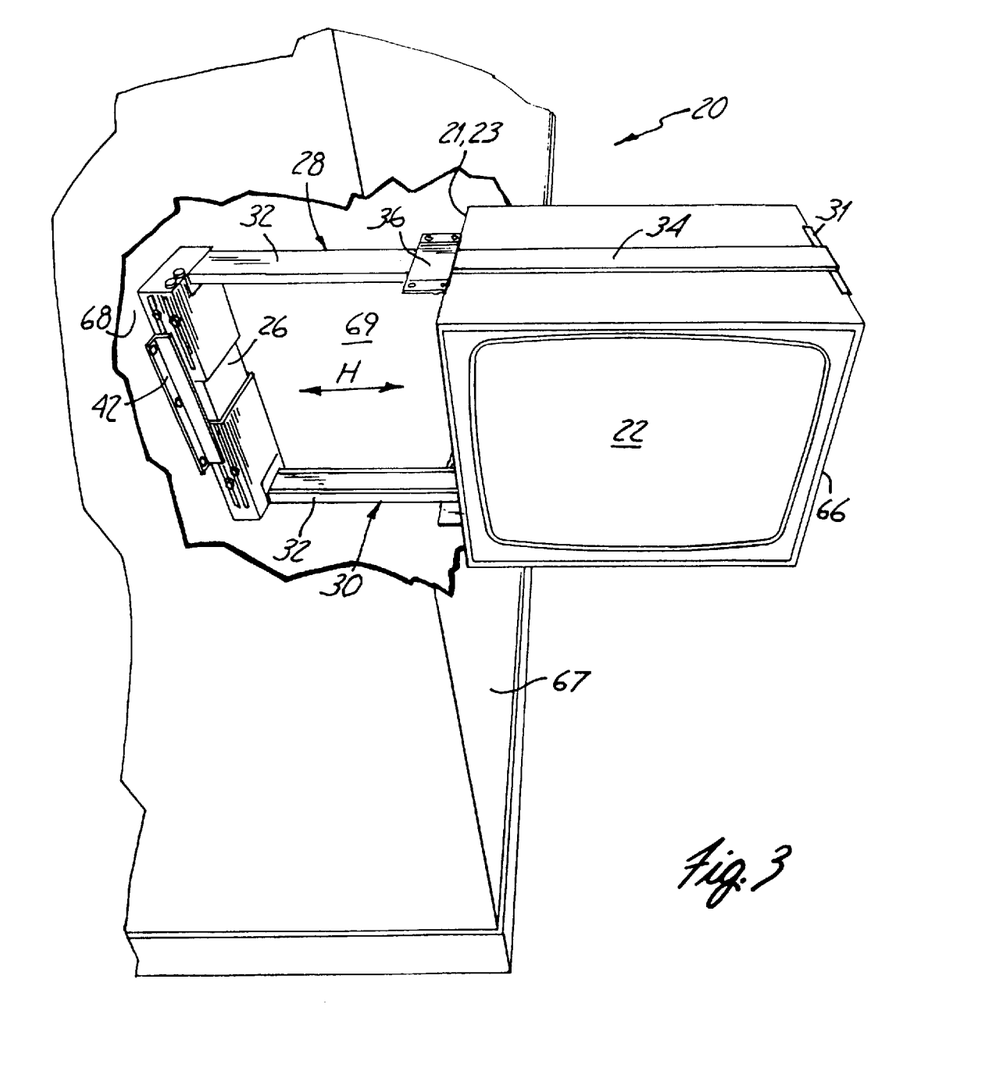
FIG. 3 is a perspective view of a modular projector lift system extending horizontally beyond a surface.

FIGS. 1–3 show various orientations of the modular projector lift system 20 of the present invention. FIG. 1 is a perspective view of a modular projector lift system 20 for moving a projector device 22 along a path H between an extended position 25 and a retracted position in recess 41. The movable support 28 is engaged with the drive housing 26 by first portion 70. The movable support 30 is engaged with the drive housing 26 by second portion 72. A mounting bracket 36 is rigidly attached to the distal ends of first telescoping extrusions 32. The first and second portions 70, 72 are telescopically engaged with the drive housing 26, as will be discussed below. It will be understood that attachment of the first and second portions 70, 72 to the drive housing 26 may be achieved by a variety of means, such as the slotted openings 70A and 72A.

Figure 4:
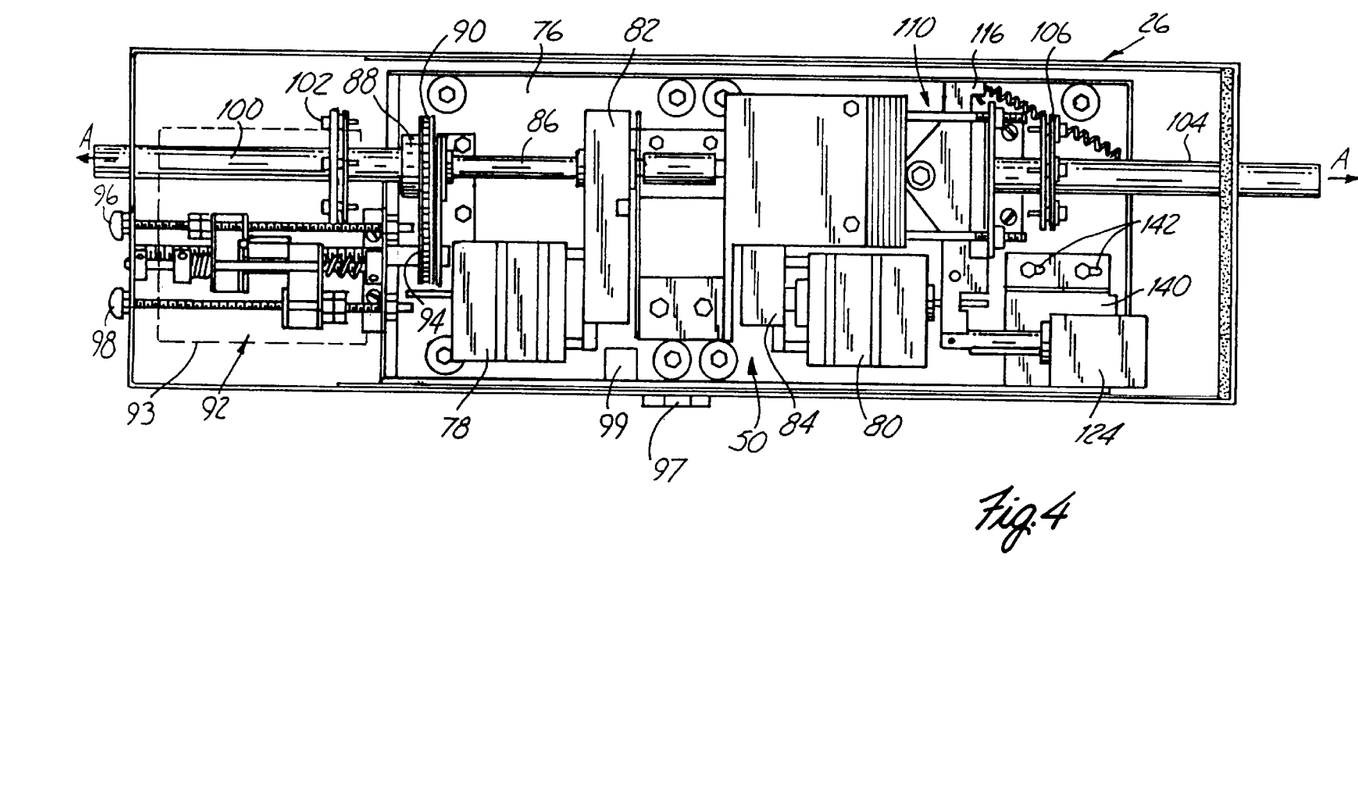
FIG. 4 is a top view of an expandable drive assembly for use with the present modular projector lift system.
Figure 5:
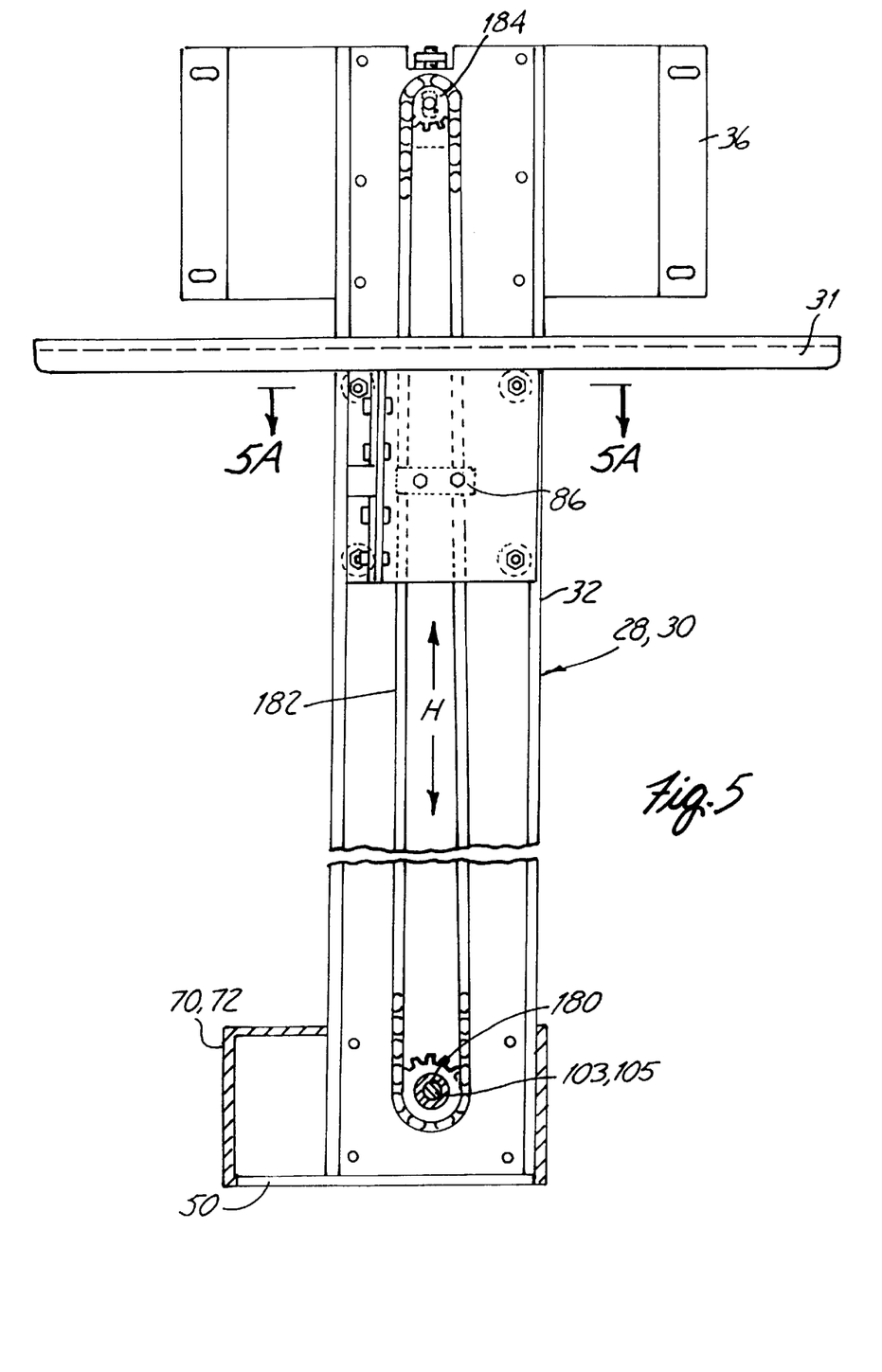
FIG. 5 is a side view of a movable support for use with the present modular projector lift system.
Figure 5A:
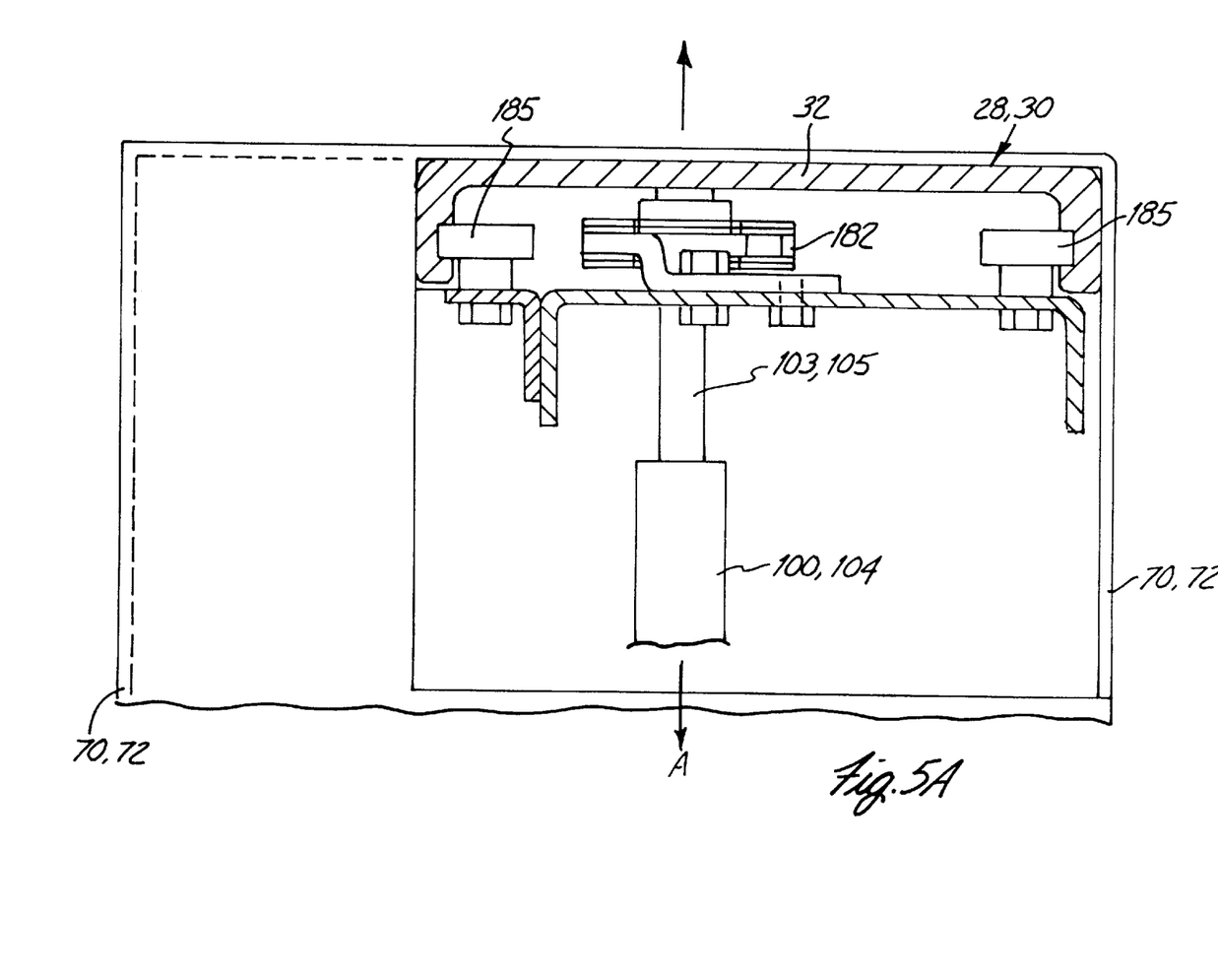
FIG. 5A is an end view of the movable support of FIG. 5.

Slide bracket 31 at the end of second telescoping extrusions 34 and rides along an inside surface of the first extrusions 32 with rollers 185 (see also FIGS. 5 and 5A). The drive housing 26 is mounted to a surface 40 by a mounting bracket 42. A drive assembly 50 (see FIG. 4) contained within the drive housing 26 serves to raise and lower the slide bracket 31 in the first extrusions 32 so that the projector device 22 can be positioned either above surface 52 in a recess 41, or below the surface 52. The surface 52 is typically a ceiling or inner surface of a cabinet structure.

FIG. 2 is a perspective view of an alternate configuration of the present modular projector lift system 20 in which the projector device 22 can be positioned either above or below surface 54. A projector platform 24 is connected to the slide brackets 31 for supporting the projector device 22. The surface 54 may be a floor, the top of a cabinet or table. The mounting bracket 42 retains the drive housing 26 to a surface 60 below the surface 54. The bracket 36 may be used to attach the movable supports 28, 30 to the inside of a cabinet or other structure. A false surface 62 is preferably provided on the top of the projector device 22. The false surface 62 is preferably flush with the surface 54 when the projector device 22 is positioned in recess 64.

FIG. 3 is a perspective view of an alternate configuration of the present modular projector lift 20 in which the projector device 22 can be moved horizontally along a path H between an extended position and a retracted position. The second extrusion 34 is preferably attached to the slide bracket 31. The second extrusion 34 serves to support the projection device 22 when in the extended position. Additionally, by attaching the projection device 22 to the distal ends of the extrusions 34, the effective length of the path H can be extended.

Surface 67 is preferably a wall or the side of a cabinet. The mounting bracket 42 retains the drive housing 26 to a surface 68 inside recess 69. A false surface 66 is preferably provided on the side of the projector device 22 so that it will be flush with the surface 67 when the projector device 22 is positioned in recess 69.

A pressure sensitive switch 21, such as a ribbon switch available from Tapeswitch Corporation of Farmingdale, N.Y., is preferably positioned around a perimeter 23 of the projector device 22, or alternatively around the perimeter of the platform 24 (see FIG. 2). In the event that an object or fingers of the user are accidentally located along the shear point between the modular projector lift system 20 and one of the surfaces 52, 67, the switch 21 reverses the movement of the projection device 22.

FIG. 4 is a top view of the drive housing 26 containing a drive assembly 50. The first and second portions 70, 72 (see also FIGS. 1–3) may be expanded or contracted along an axis A to accommodate projector devices of various sizes. The axis A is preferably parallel to the axis of drive shaft 86. In one embodiment, the first and second portions 70, 72 can be expanded to accommodate projector devices having a width of between 0.69 and 0.94 meters.

The drive assembly 50 is preferably mounted to a drive assembly plate 76 contained within the drive housing 26. The drive assembly 50 includes a pair of motors 78, 80, each including a direct drive transmission system 82, 84, respectively, for engaging with the drive shaft 86. A motor with a suitable internal braking system is available from Merkle-Korff Industries, Inc. of Des Plaines, Ill., under model number 189400. A timing chain 90 couples the drive shaft 86 to a limit switch mechanism 92 via pulleys 88, 94. The limit switch mechanism 92 includes a pair of thumb screws 96, 98 accessible from the outside of the drive housing 26 for adjusting the limit switch mechanism 92, as will be discussed in detail below. A control circuit 93 is preferably located below the limit switch mechanism 92. Plug 97 connects power cables and control cables (not shown) for operating the present modular projector lift 20. Alternatively, a detector 99 may be provided for receiving infrared or RF signals for controlling the modular projector lift 20.

First telescoping drive shaft 100 is engaged with the drive shaft 86 via a coupling 102. Correspondingly, a second telescoping drive shaft 104 is coupled with the drive shaft 86 by a coupling 106. As best seen in FIG. 5A, the first telescoping drive shaft 100 telescopically engages with a corresponding drive shaft 103 in the first portion 70 of the movable support 28. Consequently, the movable support 28 can be extended or retracted along a drive axis A while maintaining a mechanical engagement between the drive shafts 100, 103. The second telescoping drive shaft 104 telescopically engages with a corresponding drive shaft 105 in the second portion 72 of the movable support 30. The second telescoping drive shaft 104 may also be extended or contracted along the axis A in a manner corresponding with the movement of the second portion 72.

Figure 6:
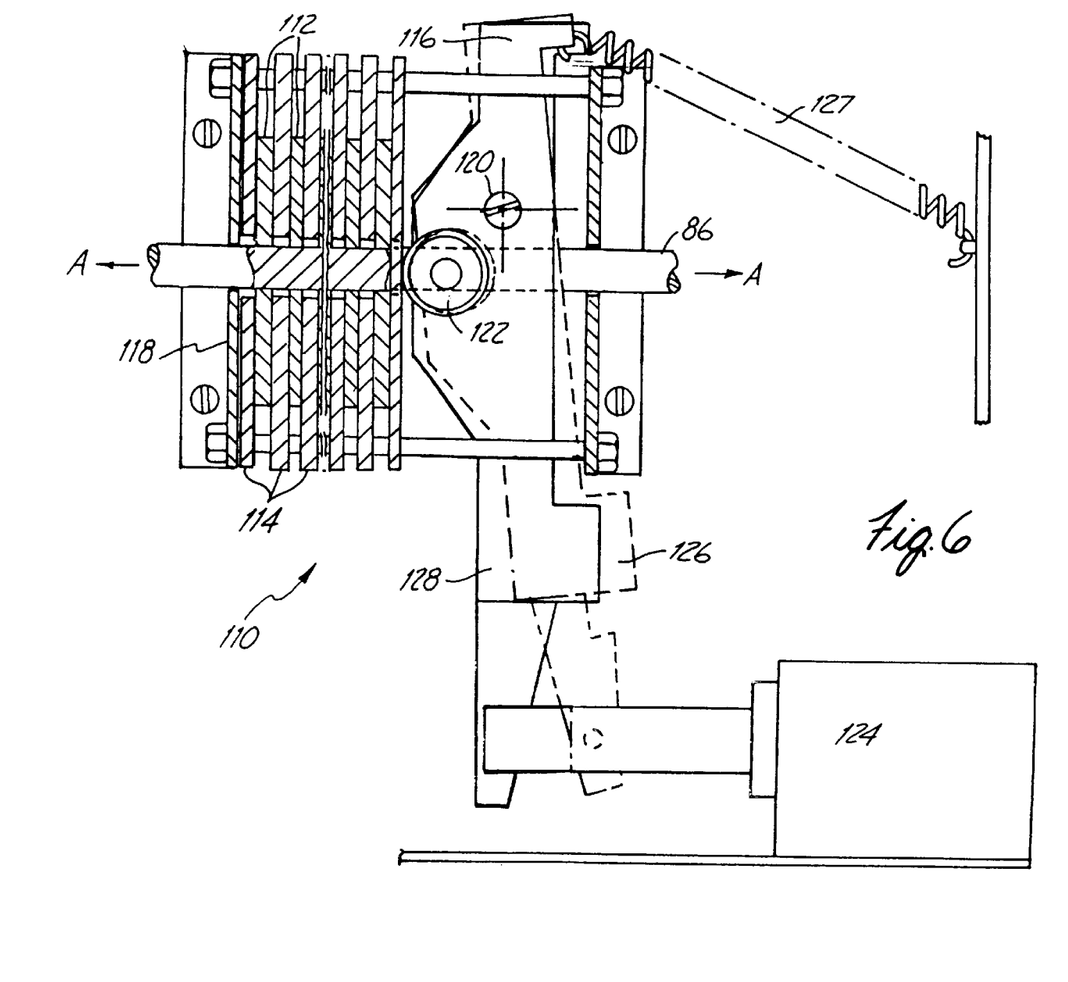
FIG. 6 is a top view of a brake assembly for use with the present modular lift system.

Rotation of the drive shaft 86 is controlled by brake mechanisms internal to the motors 78, 80 (not shown) and the brake assembly 110. As best illustrated in FIG. 6, the brake assembly 110 includes a series of inner brake plates 112 mounted to the drive shaft 86. Each of the inner brake plates 112 is interposed between outer brake plates 114 which are not engaged with the drive shaft 86. A rocker arm 116 mounted at pivot point 120 provides a compressive force on brake stack assembly 118 via roller 122. A solenoid 124 is provided for moving the rocker arm 116 to a disengaged position 126 so that roller 122 moves along the axis A, away from the brake stack assembly 118. When the solenoid 124 is disengaged, biasing mechanism 127 moves the rocker arm 116 to an engaged position 128 such that the roller 122 provides a compressive force on the brake stack assembly 118. The high surface area of engagement between the inner brake plates 112 and the outer brake plates 114 provide significant braking force for the drive assembly 50.

The brake stack assembly 118 preferably includes 16 inner brake plates 112 and 15 outer brake plates 114, to provide a total surface area of engagement of approximately 387.1 cm$^2$ (60 inches$^2$). When subjected to a compressive force of approximately 71.2 Newtons (16 pounds), the brake assembly 110 provides a braking torque of approximately 21.22 Newton.meters (188 inch.lbs). The inner and outer brake plates 112, 114 are preferably constructed of steel or a variety of brake materials. The plates 112, 114 may be anodized, plated, such as with chrome, or painted with an electrodeposition process. It will be understood that the number of plates 112, 114 may vary with the desired brake force and plates of different compositions may be alternated.

Turning back to FIG. 4, the solenoid 124 is mounted to the drive assembly mounting plate 76 by a bracket 140 with a pair of tensioning slots 142 so that the location of the solenoid 124 relative to the rocker arm 116 can be adjusted for optimum performance. A pair of brake assembly tension adjustment slots 146 are provided for adjusting the position of the brake assembly 100 relative to the rocker arm 116, so that the static load on the brake stack assembly 118 can be adjusted when the rocker arm 116 is in the engaged position 128.

FIGS. 5 and 5A illustrate the movable supports 28, 30 engagable with the drive assembly 50 of the present modular projector lift system 20. The movable supports 28, 30 are rigidly connected to the first or second portions 70, 72. Sprocket 180 is mechanically engaged with a drive shafts 103, 105 that telescopically engage with one of the telescoping drive shafts 100, 104. A sprocket 184 is rotatably mounted on the distal end of the extrusion 32 proximate the mounting bracket 36. Drive chain 182 extends around sprockets 180, 184. The drive chain 182 is fixedly attached to the slide bracket 31 at bracket 186. Rotation of the sprocket 180 causes the slide bracket 31 to move along the path H in the extrusion 32 between an extended position and a retracted position past surfaces 52, 54, 67. The slide bracket 31 preferably includes a series of rollers 185 to insure smooth engagement with the extrusion 32. In one embodiment, the movable supports 28, 30 provide up to 0.94 meters of travel with a lifting capacity in excess of 100 kgs. It will be understood by those of skill in the art that the travel and lifting capacity may be varied without departing from the scope of the present invention.

Figure 5B:
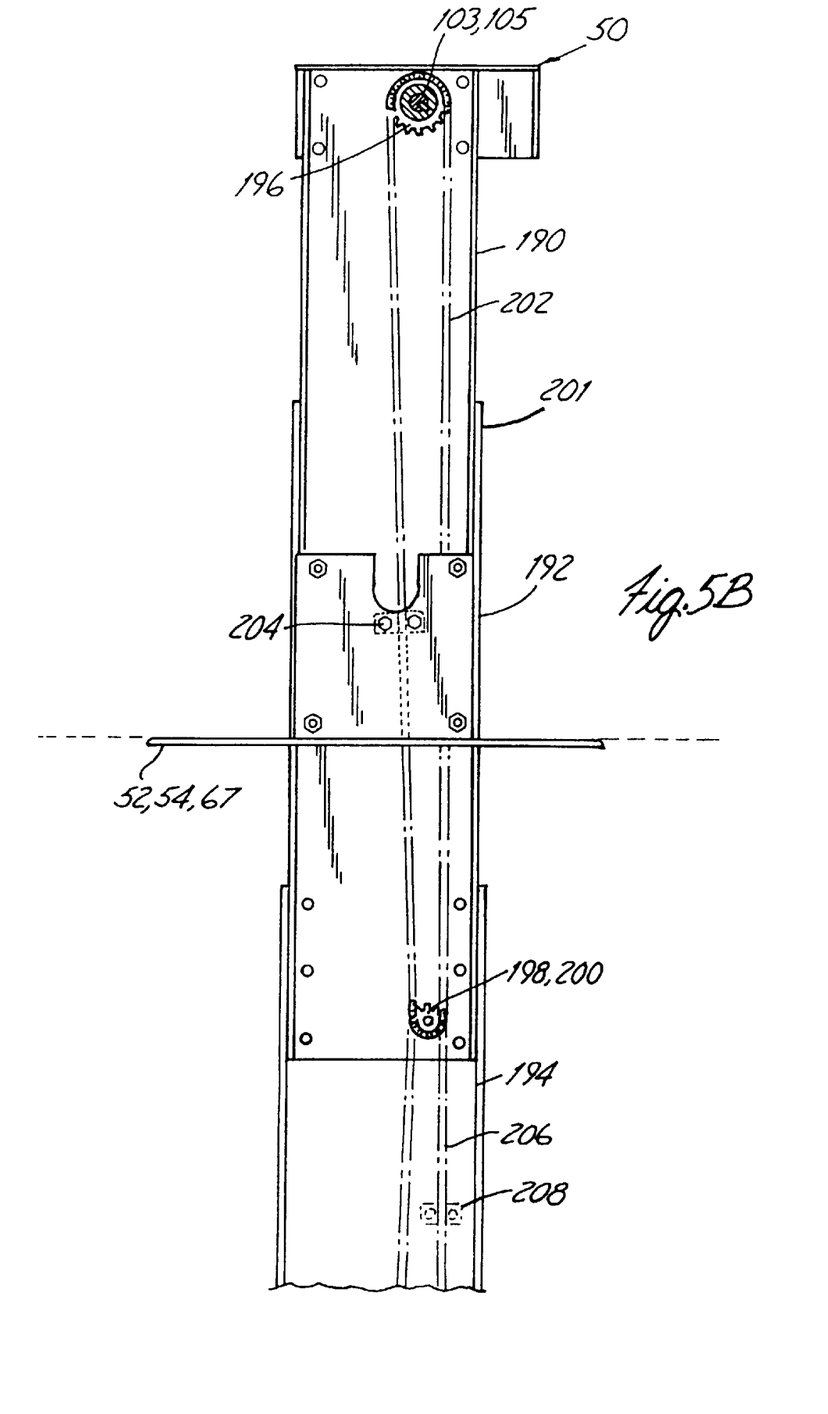
FIG. 5B is a side view of an alternate movable support containing a plurality of telescoping extrusion members for use with the present modular projector lift system.

FIG. 5B illustrates an alternate embodiment in which the movable supports 201 include three or more telescoping rails 190, 192, 194 engaged with the drive assembly 50 of the present modular projector lift system 20. A first telescoping rail 190 is rigidly connected to the first or second portions 70, 72. Sprocket 196 is mechanically engaged with a drive shafts 103, 105 that telescopically engages with one of the telescoping drive shafts 100, 104, as discussed above. A pair of keyed sprockets 198, 200 are rotatably mounted on the second telescoping rail 192 so that they turn together. A drive chain 202 extends around sprockets 196, 198. The drive chain is fixedly attached to the second telescoping rail 192 at bracket 204. A second drive chain 206 extends around the sprocket 200 and a second rotating sprocket (not shown) on a distal end of the third telescoping rail 194. The second drive chain 206 is fixedly attached to the third telescoping rail 194 by a bracket 208. Rotation of the sprocket 196 causes simultaneous rotation of the sprockets 198, 200, causing synchronous movement of the second and third telescoping rails 192, 194 between an extended position and a retracted position past surfaces 52, 54, 67. It will be understood that the number of telescoping rails may vary without departing from the scope of the present invention.

Figure 7:
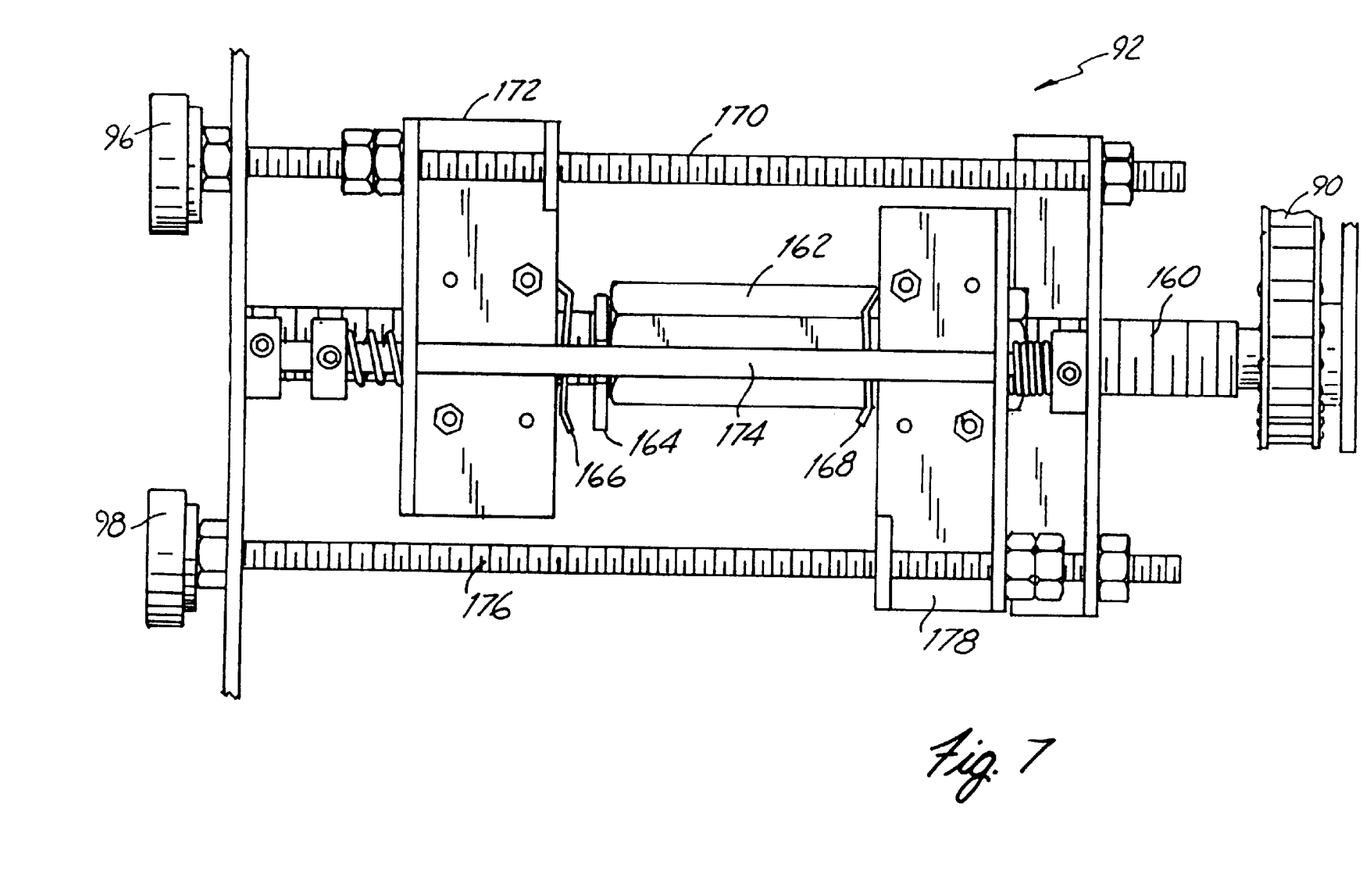
FIG. 7 is a top view of a travel limit mechanism for use with the present modular projector lift system.

FIG. 7 is a top view of the limit switch mechanism 92. As the drive shaft 86 rotates (see FIG. 4), the timing chain 90 causes a coupling nut 162 to move along a threaded lead screw 160. The coupling nut 162 includes a plate 164 for activating limit switches 166, 168. The thumb screw 96 is connected to an adjustment screw 170 for moving an upper limit slider 172 along a support shaft 174. As the coupling nut 162 moves along the threaded shaft 160 due to rotation of the drive shaft 86, the plate 164 eventually engages the limit switch 166. The limit switch deactivates the motor and prevents further movement of the projector platform 24 relative to the drive housing 26. Similarly, thumb screw 98 is connected to adjustment screw 176. Rotation of the thumb screw 98 causes lower limit slider 178 to move along support shaft 174. Rotation of the drive shaft 86 in the opposite direction causes the coupling nut 162 to move in the alternate direction until the plate 164 engages the limit switch 168. The user can limit the movement of the projector platform 24 in either direction by positioning the upper and lower limit sliders 172, 178 at an appropriate location along the length limit switch mechanism 92.

The present invention has now been described with reference to several embodiments described herein. It will be apparent to those skilled in the art that many changes can be made in the embodiments without departing from the scope of the invention. Thus, the scope of the present invention should not be limited to the structures described herein, but only to structures described by the language of the claims and the equivalents to those structures.

What is claimed is:

1. A modular projector lift system for moving a projection device along a path between an extended position and a retracted position, the modular projector lift system comprising:

a motorized drive assembly expandable along a first axis, the drive assembly comprising a motor having a telescoping drive shaft; and at least one movable support movable along a second axis which is generally perpendicular to the first axis for moving the projection device between the extended position and the retracted position, the at least one movable support mechanically engaged with the drive assembly at one of a plurality of positions along the first axis and being movable by the drive assembly along the second axis.

2. The system of claim 1 wherein the at least one movable support is telescopically engaged with the drive assembly.

3. The system of claim 1 wherein the telescoping drive shaft of the drive assembly is oriented parallel to the first axis.

4. The system of claim 1 wherein the path is vertical.

5. The system of claim 1 wherein the retracted position is vertically off-set from the extended position.

6. The system of claim 1 wherein the path is horizontal.

7. The system of claim 1 wherein the retracted position is horizontally off-set from the extended position.

8. The system of claim 1 wherein the at least one movable support comprises at least one telescoping extrusion member.

9. The system of claim 1 wherein the at least one movable support comprises a pair of movable supports each having an adjustable separation along the first axis relative to the drive assembly.

10. The system of claim 1 further comprising a false surface means for concealing the projection device when in the retracted position.

11. The system of claim 1 wherein the drive assembly further comprises a drive chain coupled to the at least one movable support.

12. The system of claim 1 wherein the drive assembly further comprises a brake mechanism for maintaining a position of the at least one movable support relative to the drive assembly.

13. The system of claim 12 wherein the brake mechanism is activated when electric power to the drive assembly is reversed.

14. The system of claim 12 wherein the brake mechanism comprises a plurality of rotating brake plates connected to the drive shaft, the drive shaft coupling the drive assembly to the at least one movable support, and a plurality of static brake plates connected to the drive assembly and compressively engaged with the rotating brake plates, respectively.

15. The system of claim 14 wherein the brake mechanism comprises means for providing variable levels of compressive engagement between the rotating and the static brake plates.

16. The system of claim 1 wherein the drive assembly further includes an adjustable limit switch for adjusting a location of the retracted position along the path.

17. The system of claim 1 wherein the drive assembly further includes an adjustable limit switch for adjusting a location of the extended position along the path.

18. The system of claim 1 further including at least one emergency pressure switch for reversing movement of the projection device along the path.

19. The system of claim 1 wherein the at least one movable support further comprises a platform for supporting the projection device and pressure switch means located along a perimeter of the platform for reversing movement of the projection device along the path.

20. A modular projector lift system for moving a projection device along a path between an extended position and a retracted position, the modular projector lift system comprising:

a motorized drive assembly expandable along a first axis, the drive assembly including a telescoping drive shaft oriented parallel to the first axis;

a pair of movable supports mechanically coupled to the drive shaft for moving the projection device between the extended position and the retracted position, each of the movable supports having an adjustable separation along the first axis relative to the drive assembly; and a brake mechanism for maintaining a position of at least one of the pair of movable supports relative to the drive assembly, the brake mechanism comprising a plurality of rotating brake plates connected to the drive shaft and a plurality of static brake plates connected to the drive assembly compressively engaged with the rotating brake plates.

21. The system of claim 20 wherein the path is vertical.

22. The system of claim 20 wherein the retracted position is vertically off-set from the extended position.

23. The system of claim 20 wherein the path is horizontal.

24. A modular projector lift system for moving a projection device along a path between an extended position and a retracted position, the modular projector lift system comprising:

a motorized drive assembly expandable along a first axis;

adjustable limit switches for adjusting a location of the retracted and the extended positions along the path; and a pair of movable supports operatively coupled to the drive assembly and movable along a second axis which is generally perpendicular to said first axis for moving the projection device between the extended position and the retracted position, each of the movable supports having an adjustable separation relative to the other along the first axis and being movable to the drive assembly along the second axis; and a brake mechanism adapted to maintain a position of at least one of said pair of movable supports relative to the drive assembly.

* * * * *